US012709184B2

(12) United States Patent
Harker et al.

(10) Patent No.: US 12,709,184 B2
(45) Date of Patent: Aug. 18, 2026

(54) ELECTRIC VEHICLE DRIVING RANGE OPTIMIZER

(71) Applicant: PACCAR Inc, Bellevue, WA (US)

(72) Inventors: Nick Harker, Renton, WA (US); Andrew Harbach, Argyle, TX (US)

(73) Assignee: PACCAR Inc, Bellevue, WA (US)

( * ) Notice: Subject to any disclaimer, the term of this patent is extended or adjusted under 35 U.S.C. 154(b) by 42 days.

(21) Appl. No.: 18/615,254

(22) Filed: Mar. 25, 2024

(65) Prior Publication Data

US 2025/0296471 A1 Sep. 25, 2025

(51) Int. Cl.
*B60L 58/12* (2019.01)
*B60H 1/00* (2006.01)

(52) U.S. Cl.
CPC .......... *B60L 58/12* (2019.02); *B60H 1/00392* (2013.01); *B60L 2240/60* (2013.01); *B60L 2260/54* (2013.01)

(58) Field of Classification Search
CPC .. B60L 58/12; B60L 2240/60; B60L 2260/54; B60H 1/00392
See application file for complete search history.

(56) References Cited

U.S. PATENT DOCUMENTS 9,517,705 B1 * 12/2016 Liu ..................... B60L 15/2045
2018/0237016 A1 * 8/2018 Khafagy .................. B61H 1/00
2018/0257666 A1 * 9/2018 Bryan ................ B60H 1/00385
2019/0176640 A1 * 6/2019 Lee ........................ B60K 35/26
2019/0299811 A1 * 10/2019 Bryngelsson ........... B60L 58/12
2020/0307621 A1 * 10/2020 Ostrowski ............ G07C 5/0808
2020/0317074 A1 * 10/2020 Miller ...................... B60L 53/36
2021/0245739 A1 * 8/2021 Verburg ................ B60W 50/08
2022/0108248 A1 * 4/2022 Oobayashi .............. B60L 53/64
2023/0077434 A1 * 3/2023 Penilla .................... H04L 67/06 709/217
2023/0166601 A1 * 6/2023 Schneider ............... B60L 58/15 701/70
2023/0249599 A1 * 8/2023 Nicola ................. B60N 2/0244 297/284.6
2023/0271529 A1 * 8/2023 Bryngelsson ........... B60L 58/13 701/22

(Continued)

FOREIGN PATENT DOCUMENTS

JP 2023538441 A * 9/2023 .............. B60L 53/00

*Primary Examiner* — Amelia Vorce

(57) ABSTRACT

A method and system for providing electric vehicle drive range optimization. Various vehicle data is collected from various sources and analyzed to derive vehicle parameters related to estimating a driving range of an electric vehicle, such as battery state of charge, an energy consumption rate, an efficiency factor, historical driving patterns, climate control usage, auxiliary accessory usage, etc. The vehicle parameters are analyzed to determine a vehicle driving state adjustment that changes a vehicle parameter that causes the estimated driving range to increase. Some example vehicle drive state adjustments may correspond to adjusting vehicle speed, adjusting a throttle map, reducing the auxiliary electrical load, and/or other adjustments to lower the energy consumption rate and/or increase one or more efficiency factors to extend the estimated driving range. The vehicle driving state adjustment may be implemented automatically or manually based on a determined implementation method.

19 Claims, 6 Drawing Sheets

(56) References Cited

U.S. PATENT DOCUMENTS

| | | | | |
|---|---|---|---|---|
| 2024/0118099 | A1* | 4/2024 | Weld | G01C 21/3469 |
| 2024/0262242 | A1* | 8/2024 | Poloni | G01C 21/3469 |
| 2024/0308387 | A1* | 9/2024 | Tang | B60L 58/12 |
| 2024/0351478 | A1* | 10/2024 | Havrisciuc | B60L 58/30 |
| 2024/0361137 | A1* | 10/2024 | Aviv | B60L 58/12 |
| 2024/0416794 | A1* | 12/2024 | Tseng | B60L 58/12 |
| 2025/0128709 | A1* | 4/2025 | Liu | B60W 30/146 |

* cited by examiner

ELECTRIC VEHICLE DRIVING RANGE OPTIMIZER

BACKGROUND

Electric vehicles (including hybrid vehicles) use a rechargeable battery to operate an electric motor and/or other components of the vehicle. The electric vehicle's driving range refers to a maximum distance the vehicle can travel on a current battery state charge and is affected by various factors, such as driving conditions, weather, use of in-vehicle features, vehicle speed, driver behaviors, etc. An estimate of the electric vehicle's driving range can be an important piece of information for the electric vehicle and/or the vehicle's driver. For instance, whether the vehicle makes it to a next charging station, can complete its trip, or alternatively, is stranded on the side of the road may depend on the driving range estimate. Therefore, is it desirable to estimate the electric vehicle's driving range accurately. Extending the electric vehicle's driving range may additionally be desirable to maximize use of the vehicle and the driver.

While relatively specific examples have been discussed, it should be understood that aspects of the present disclosure should not be limited to solving the specific examples identified in the background.

SUMMARY

The disclosure generally relates to improving driving range calculation. For instance, an estimated driving range of an electric vehicle is determined based on various vehicle parameters derived from collected sensor data. The vehicle parameters may be analyzed to determine a vehicle driving state adjustment that changes a vehicle parameter and may cause the estimated driving range to increase. The vehicle driving state adjustment may be communicated to a driver of the vehicle and/or to a back-office computing device for implementation.

According to an aspect, a method is described, comprising: receiving driving range optimization settings for an electric vehicle; collecting vehicle data corresponding to a driving state of the electric vehicle; determining an estimated driving range based on the vehicle data; determining a vehicle driving state adjustment that extends the estimated driving range to an adjusted driving range; determining whether the adjusted driving range satisfies a threshold; when the adjusted driving range satisfies the threshold, determining, based on the driving range optimization settings, an implementation method for the vehicle driving state adjustment; and implementing the vehicle driving state adjustment according to the determined implementation method.

According to another aspect, an electric vehicle is described, comprising: a battery; sensors; and an edge electronic control unit comprising: at least one processing unit; and a memory including instructions, which when executed by the processing unit, cause the system to: collect vehicle data from the sensors corresponding to a driving state of the electric vehicle; determine an estimated driving range based on a capacity of the battery and the vehicle data; determine a vehicle driving state adjustment that extends the estimated driving range to an adjusted driving range; receive driving range optimization settings for the electric vehicle; determine whether the adjusted driving range satisfies a threshold; when the adjusted driving range satisfies the threshold, determine, based on the driving range optimization settings, an implementation method for the vehicle driving state adjustment; and implement the vehicle driving state adjustment according to the determined implementation method.

According to another aspect, a system is described, comprising: at least one processing unit; and a memory including instructions, which when executed by the processing unit, cause the system to: collect vehicle data corresponding to a driving state of a first electric vehicle and a second electric vehicle; determine a first estimated driving range for the first electric vehicle and a second estimated driving range for the second electric vehicle based on the vehicle data; determine a first vehicle driving state adjustment and a second vehicle driving state adjustment, where the first vehicle driving state adjustment extends the first estimated driving range to a first adjusted driving range and the second vehicle driving state adjustment extends the second estimated driving range to a second adjusted driving range; determine the first adjusted driving range and the second adjusted driving range meet a threshold; receive fleet settings for the first electric vehicle and the second electric vehicle; determine, based on the fleet settings, a first implementation method for the first vehicle driving state adjustment and a second implementation method for the second vehicle state adjustment; cause the first vehicle driving state adjustment to be implemented according to the first implementation method; and cause the second vehicle state adjustment to be implemented according to the second implementation method, which is different from the first implementation method.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following figures.

DETAILED DESCRIPTION

Figure 1:
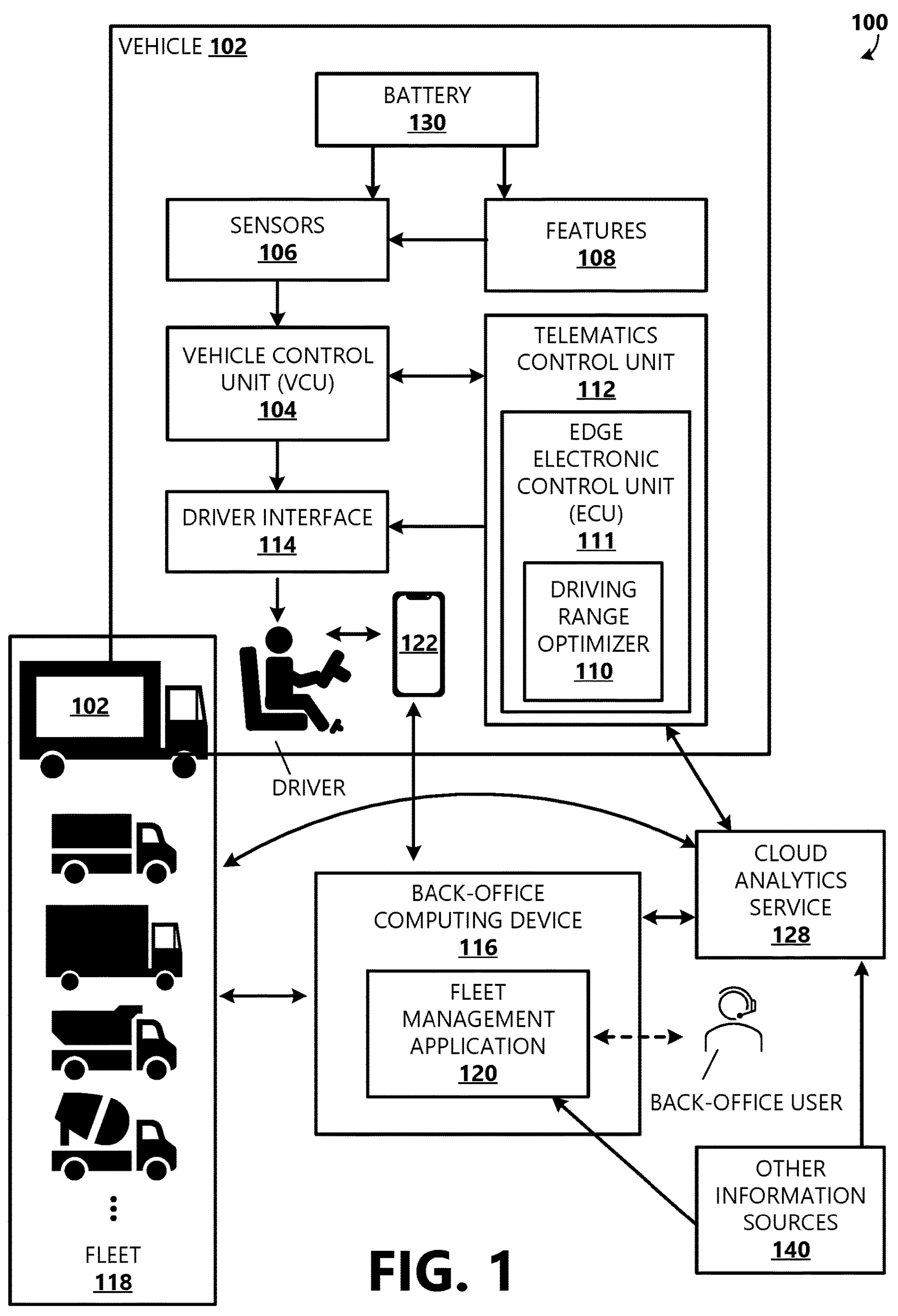
FIG. 1 is a block diagram illustrating a system in which driving range optimization may be implemented according to an example.

The following detailed description refers to the accompanying drawings. Wherever possible, the same reference numbers are used in the drawings and the following description to refer to the same or similar elements. While aspects of the present disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods.

Accordingly, the following detailed description does not limit the present disclosure, but instead, the proper scope of the present disclosure is defined by the appended claims. The following detailed description is, therefore, not to be taken in a limiting sense.

The present disclosure relates to systems and methods to improve the driving range of an electric vehicle and the calculation thereof. In examples, an estimated driving range of the vehicle is determined based on various vehicle parameters derived from collected sensor data and environmental data. In examples, the vehicle parameters are analyzed to determine one or more vehicle driving state adjustment(s) that, if implemented, would increase the estimated driving range. Some example vehicle drive state adjustments may correspond to adjusting vehicle speed, adjusting a throttle map, reducing the auxiliary electrical load, changing a route, and/or other adjustments to lower the energy consumption rate and/or increase one or more efficiency factors to extend the estimated driving range. The vehicle driving state adjustment may be implemented automatically or recommended to be done manually by a driver based on received settings, a measure of the expected improvement, and the need for the extended driving range, among other possibilities. These and other examples are discussed below with reference to FIGS. 1-5.

FIG. 1 is a block diagram illustrating an example system 100 in which driving range improvements may be implemented to extend driving range of a vehicle 102 according to an example. In some implementations, the vehicle 102 is included in a fleet 118 of vehicles owned, operated, and/or managed by a single organization, company, government agency, etc., (referred to herein as a fleet entity). In examples, the vehicle 102 and the other vehicles in the fleet 118 may be assembled to serve a common purpose or function (e.g., transportation of goods, personnel, public transportation, delivery services, emergency services). In further examples, the fleet entity includes a back-office computing device 116 (e.g., a desktop computer, tablet, laptop device, mobile phone) including a fleet management application 120. The vehicle 102 (and other vehicles in the fleet 118) includes a telematics control unit 112, where the telematics control unit 112 includes one or more communication interfaces for establishing connections with cloud-based servers or services via cellular networks, Wi-Fi, and/or other connectivity options. For instance, the telematics control unit 112 may allow the vehicle 102 (and other vehicles in the fleet 118) to communicate with the fleet management application 120, a cloud analytics service 128, other information sources 140, and/or other endpoints via the established connections. In some implementations, the fleet management application 120 is in further communication with a driver of the vehicle 102 (and other drivers of other vehicles in the fleet 118) via a driver communication device 122 (e.g., a phone, tablet, wearable device, or other mobile computing device). For instance, the fleet management application 120 may send messages to the driver communication device 122 to provide notifications to the driver.

The fleet 118 may include a variety of vehicle types (e.g., depending on the fleet entity's needs). In some implementations, the vehicle 102 is a truck, such as a light, medium, and heavy-duty truck. For instance, the vehicle 102 may be a Class 8 truck used for heavy-duty applications, such as long-haul freight transportation, regional hauling, and/or other tasks that require the capability to carry substantial loads over long distances. In other examples, the vehicle 102 may have a configuration of a tractor-trailer, dump truck, concrete mixer, or other specialized heavy-duty vehicle. However, the methods and systems can be used by vehicles 102 of different types and/or sizes. For instance, aspects of the disclosed subject matter may have wide application and, therefore, may be suitable for use with other types of vehicles, such as passenger vehicles, buses, motor homes, etc. Accordingly, the following descriptions and illustrations herein should be considered illustrative in nature and, thus, not limiting of the scope of the claimed subject matter.

According to an aspect, the vehicle 102 is powered by one or more electric motors using electrical energy provided by one or more rechargeable batteries, herein referred to collectively as a battery 130. In some examples, the vehicle 102 is a battery electric vehicle (BEV) that is powered exclusively by the battery 130. In other examples, the vehicle 102 is a plug-in hybrid electric vehicle (PHEV) that includes an internal combustion engine integrated with the electric motor(s) and battery 130. In further examples, the vehicle 102 is a fuel cell electric vehicle (FCEV) that utilizes hydrogen fuel cells to generate power for its electric motor. A driving range of the vehicle 102 refers to a maximum distance the vehicle 102 can travel on the battery's state of charge (SOC). In an example implementation, the vehicle's driving range is estimated based on a current SOC of the battery 130, an energy consumption rate, and storage capacity of the battery 130. In another example implementation, the estimated driving range is updated based on navigation information. Navigation information may include such information as location information derived from sensors 106 such as GPS transceivers (e.g., where the vehicle 102 is currently and the vehicle's direction of travel and it's direction of travel), preloaded mapping information and/or mapping information accessed from a remote source, route information, which may be calculated (and recalculated) based on the location information, the mapping information, and other external data, such as traffic information, weather information, road condition information, etc. In another example implementation, the estimated driving range is updated based on various vehicle data collected from various sources. In examples, vehicle data includes various sensor data, parameters derived from the sensor data, and other relevant information.

Sensor data may be collected by a plurality of sensors 106 installed on the vehicle 102. For instance, various sensors 106 capture real-time data (e.g., measurements) related to vehicle drive state. The sensors 106 may include wheel speed sensors, engine speed sensors, temperature sensors, battery SOC sensors, accelerometers, GPS (Global Positioning System), current sensors, and other devices that monitor different aspects of the vehicle's behavior, driver's behavior, location, position, and/or environment. For example, sensor data may include real-time data on vehicle speed, acceleration, braking, battery SOC, GPS location, external temperature, weather conditions, use of in-vehicle features 108 (e.g., electric motor, lights, entertainment system, air conditioning, auxiliary accessories, etc.), terrain, driving conditions, and/or other dynamic factors. In some examples, sensor data is additionally collected by sensors 106 installed on other vehicles in the fleet 118 and/or other information sources 140 (e.g., sources of information about a state of roadways, construction, traffic, elevation, etc.,) and communicated to the cloud analytics service 128 and/or back-office computing device 116.

In an example implementation, the estimated driving range is determined by an edge electronic control unit (ECU) 111. The edge ECU 111 may handle high-speed communication and data processing at the edge of a network 129, such as in the vehicle 102. In examples, the edge ECU 111 can process large amounts of data locally for making real-time decisions and adjustments to optimize vehicle functions and performance. In some implementations, the edge ECU 111 is included in the VCU 104. In other implementations (and as depicted in FIG. 1), the edge ECU 111 is communicatively connected to the VCU 104 (e.g., included in or operatively connected to the telematics control unit 112). The VCU 104 may integrate and control various electronic systems within the vehicle 102, such as an engine control unit, transmission control unit, brake system, suspension system, etc., based on decisions and/or adjustments made by the edge ECU 111 to control various aspects of the vehicle's performance, functionality, and/or safety. According to an example, the VCU 104 may manage the vehicle's electric motor and other components of the drive train that transmit power to wheels of the vehicle 102, regulate power flow between the battery 130 and the motor, manage energy, etc. In some examples, the edge ECU 111 may be used to process sensor data and make determinations in applications that require an immediate or rapid response, such as autonomous driving applications, driving range optimization applications, and/or other applications.

In an example implementation, the edge ECU 111 includes various parameter sensors that process the sensor data into various insights, herein referred to as vehicle parameters. In examples, a plurality of parameter sensors processes the sensor data and extracts vehicle parameters that are relevant for calculating the estimated driving range, where, based on the extracted vehicle parameters, the edge ECU 111 determines an estimated drive range. Example vehicle parameters derived from the sensor data may include battery SOC, an energy consumption rate at which the vehicle 102 is consuming energy, an efficiency factor corresponding to how efficiently the vehicle 102 converts stored energy into driving distance, historical driving patterns corresponding to the driver's historical behavior (e.g., based on factors such as acceleration, deceleration, and/or speed), climate control usage, auxiliary accessory usage, etc. Based on the example derived parameters, battery capacity, and other relevant driving factors, such as route, navigation time, terrain data, environmental factors, etc., an estimated driving range may be calculated.

In examples, the estimated driving range is communicated to a driver interface 114 (e.g., display system or dashboard cluster) included in the vehicle 102. For instance, the estimated driving range may be presented to provide a driver of the vehicle 102 an estimate of how far the vehicle 102 can travel on the existing battery charge under the current conditions. The estimated driving range may be dynamically updated based on received updated sensor data from the sensors 106. For example, changes in driving behavior, vehicle behavior, environmental conditions, or energy consumption patterns may cause the estimated driving range to be reduced or extended.

According to an aspect, the edge ECU 111 includes or is communicatively connected to a driving range optimizer 110. As depicted in FIG. 1, the driving range optimizer 110 is included in the telematics control unit 112; however, in other examples, the driving range optimizer 110 may be included in the VCU 104 or is a separate component in communication with the edge ECU 111. The driving range optimizer 110 analyzes vehicle data (e.g., sensor data, derived parameters, and/or other factors used to calculate the estimated driving range) to determine a vehicle drive state adjustment that extends the estimated driving range. For instance, the vehicle drive state adjustment may correspond to one or more actions that affect at least one vehicle parameter and cause the estimated driving range to increase. Some example actions included in a vehicle drive state adjustment may correspond to adjusting and/or limiting vehicle speed (e.g., activating a speed governor), adjusting a throttle map that governs a relationship between a throttle input and a resulting engine power output in the vehicle 102, reducing the auxiliary electrical load (e.g., climate control usage, internal lighting, non-essential external lighting, radio usage, or auxiliary accessory charging), changing the vehicle's route, and/or other actions to lower the energy consumption rate and/or increase one or more efficiency factors to extend the estimated driving range. In some examples, the vehicle drive state adjustment is determined based on sensor data received from one or more other vehicles in the fleet 118. For instance, another fleet vehicle may complete a same route as the vehicle 102, where one or more actions affecting at least one vehicle parameter may have been taken on the route that causes the estimated driving range of the other fleet vehicle to increase or decrease. In further examples, the vehicle drive state adjustment is determined based on sensor data received from other information sources 140. Thus, the sensor data from other fleet vehicles and/or other information sources 140 may be used to provide additional data for determining an action to extend the driving range of the vehicle 102.

The driving range optimizer 110 further determines (e.g., estimates) an adjusted driving range based on implementation of the vehicle drive state adjustment. In some examples, the adjusted driving range is evaluated against a threshold, where when the adjusted driving range satisfies the threshold, a determination is made that the adjusted driving range provides an improvement over the estimated driving range by a target magnitude. For instance, the improvement may be an increase in the distance the vehicle 102 can travel on its current SOC. In some implementations, the threshold may correspond to distance to a target destination. For instance, the vehicle 102 may not be able to reach the target destination based on the estimated driving range. When the adjusted driving range is evaluated against the distance to the target destination, a determination may be made that the adjusted driving range enables the vehicle 102 to reach the target destination, wherein the threshold is satisfied. In examples, when the threshold is satisfied, the corresponding vehicle drive state adjustment may be implemented.

The vehicle drive state adjustment may be implemented via various implementation methods. One example implementation method includes generating and presenting a notification to the driver of the vehicle 102 about the vehicle drive state adjustment. For instance, the driver may manually perform the vehicle drive state adjustment in response to receiving the notification. In some examples, the notification is persistently displayed in the driver interface 114 until it is dismissed via a driver interaction. In other examples, the notification includes a selectable option to perform the vehicle drive state adjustment. Another example implementation method includes generating and presenting a notification via the back-office computing device 116 about the vehicle drive state adjustment, where a back-office user may manually perform the vehicle drive state adjustment in response to receiving the notification. Another example implementation method includes performing the vehicle drive state adjustment automatically. For instance, an instruction may be provided to the VCU 104 of the vehicle 102 to automatically perform the vehicle drive state adjustment. In response to performing the vehicle drive state adjustment, the driving range of the vehicle 102 may be extended.

The implementation method may be determined based on driving range optimization settings received by the driving range optimizer 110. For instance, the driving range optimization settings include various characteristics that guide the driving range optimizer 110 in determining the implementation method. The driving range optimization settings may further guide the range optimizer 110 in selecting and/or deselecting one or more actions included in a vehicle drive state adjustment to implement to extend the estimated driving range 204. The driving range optimization settings may define various characteristics associated with the vehicle 102, such as an automation level of the vehicle 102, a vehicle type, whether the vehicle 102 has a driver or occupant, details about a driver profile of the driver of the vehicle 102, fleet preferences, load type (e.g., hazardous material), remaining legal hours of drive time (e.g., based on an electronic logging device (ELD)), etc. For instance, the driver profile may include information about the driver's experience level, where a first implementation method (e.g., automatically performing the vehicle drive state adjustment) may be selected for a lower level of experience, a second implementation method (e.g., notifying the back office) may be selected for a middle level of experience, and a third implementation method (e.g., notifying the driver) may be selected for a higher level of experience. As another example, the first implementation method may be selected when the vehicle 102 is autonomous or in an autonomous (or semi-autonomous) driving mode. The fleet preferences may define a preferred mode of interaction, action preferences, notification type preferences, etc. In some implementations, the implementation method determination may be further based on other factors, such as the vehicle driving state of another vehicle in the fleet 118, sensor data from another vehicle in the fleet 118, the driving range improvement amount, ambient temperature, load type, the driver's remaining legal hours of drive time, etc. For instance, if the vehicle has a driver or occupant and the ambient temperature is above an upper temperature threshold or below a lower temperature threshold, a determination may be made to deselect automatically implementing an action of reducing climate control use (e.g., air conditioning or heating).

In some examples, vehicle data (e.g., sensor data, derived parameters, driving range optimization settings, and/or other factors) used to calculate the estimated driving range or used to determine the implementation method are transmitted to the cloud analytics service 128 for additional processing. For instance, the cloud analytics service 128 may include complex algorithms, machine learning models, artificial intelligence models, and/or statistical techniques to derive meaningful insights from large and diverse datasets. In some implementations, the cloud analytics service 128 may perform advanced analytics and processing capabilities to data received from multiple vehicles in the fleet 118 to determine a recommended vehicle drive state adjustment, a corresponding adjusted driving range, and/or a determined implementation method for the adjusted vehicle drive state adjustment. The edge ECU 111 may transmit data to the cloud analytics service 128 in near real-time or based on predefined intervals. In some examples, the cloud analytics service 128 is additionally in communication with the fleet management application 120 operating on the fleet back-office computing device 116. The cloud analytics service 128 may provide the determined recommended vehicle drive state adjustment, the corresponding adjusted driving range, and/or a determined implementation method for the adjusted vehicle drive state adjustment to the vehicle 102 and/or the fleet management application 120.

Figure 2A:
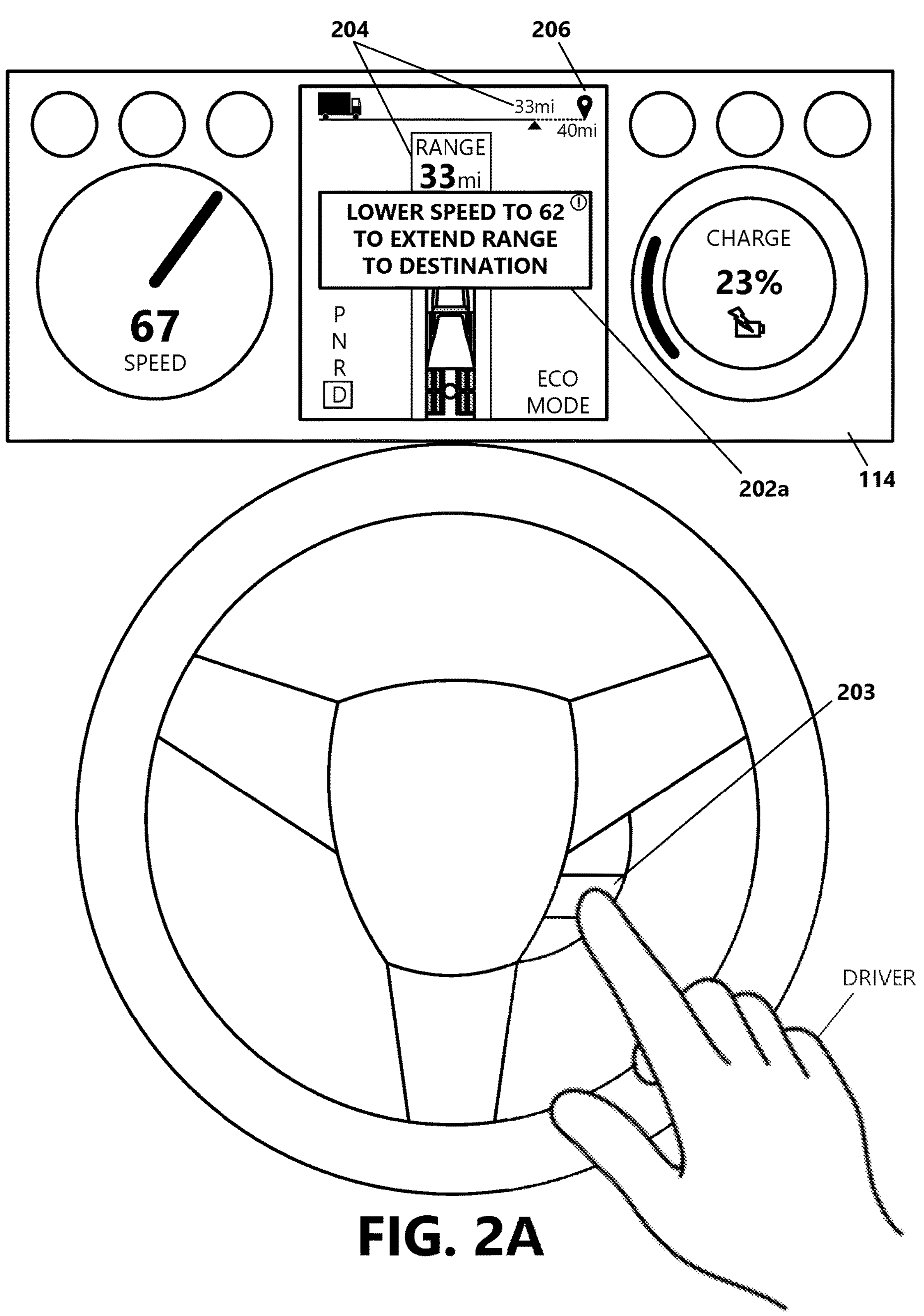
FIGS. 2A-2C are depictions of example driver interfaces that may be used for implementing a vehicle drive state adjustment according to an example.
Figure 2B:
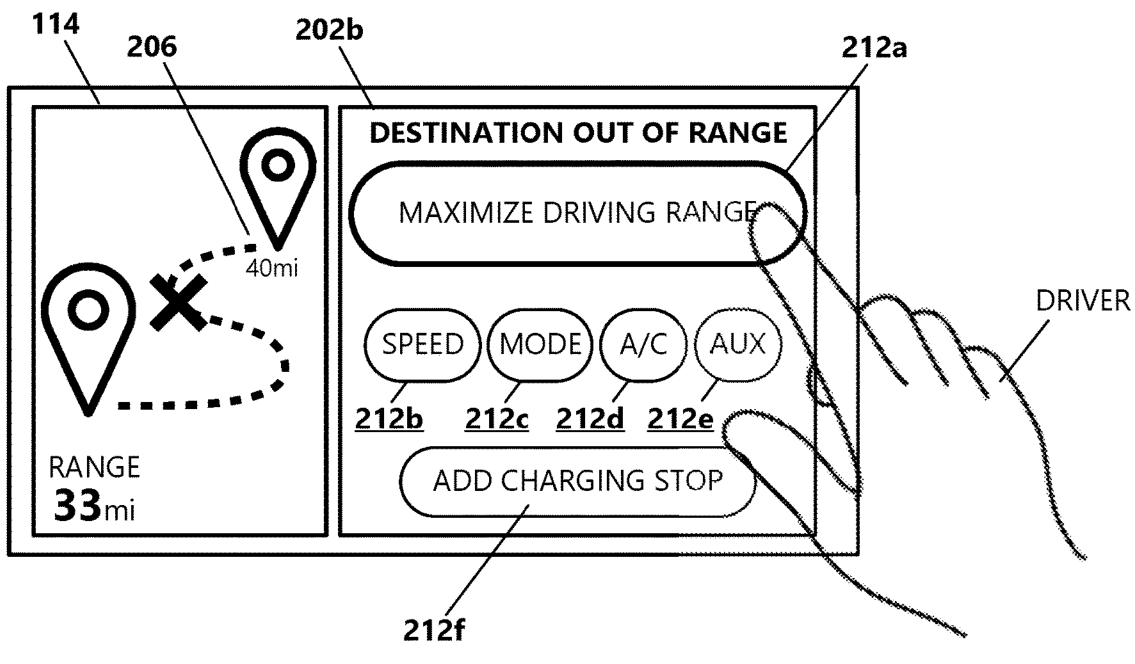
Figure 2C:
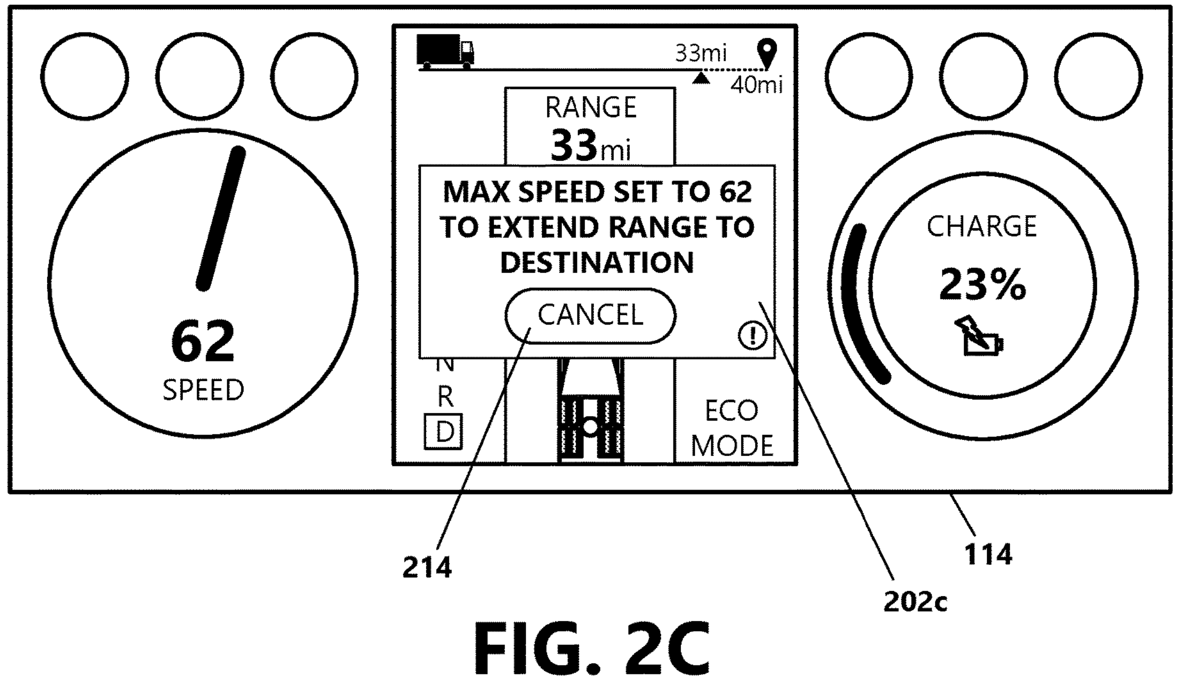

FIGS. 2A-2C depict example driver interfaces 114 that may be used for implementing a vehicle drive state adjustment. In some examples, implementing the vehicle drive state adjustment includes generating and presenting a notification 202 to a driver of a vehicle 102 in a driver interface 114. The notification 202 may be determined by an implementation method for applying the vehicle drive state adjustment. With reference now to FIG. 2A, a first example notification 202*a* is depicted. The first example notification 202*a* may correspond to a first implementation method. For instance, the first example notification 202*a* may notify/instruct the driver to perform the vehicle drive state adjustment to extend the estimated driving range 204 of the vehicle 102. In FIG. 2A, the first example notification 202*a* is displayed in a driver interface 114 (e.g., an instrument cluster) in the vehicle 102. For instance, the first example notification 202*a* may instruct/recommend the driver to lower the vehicle speed or perform another action that increases electrical efficiency and extends the estimated driving range 204. In some examples, the driver may view the first example notification 202*a* and decide whether to perform the recommended vehicle drive state adjustment(s) to extend the estimated driving range 204. In further examples, the first example notification 202*a* may be persistently displayed in the driver interface 114 until a user response is received. For instance, and as depicted in FIG. 2A, the driver may select an option 203, where the option 203 may dismiss the first example notification 202*a* or cause the vehicle drive state adjustment to be performed. In some examples, the driver interface 114 and/or the first example notification 202*a* includes other information such as the estimated driving range 204, the adjusted driving range 206, and/or an improvement corresponding to a recommended vehicle drive state adjustment.

With reference now to FIG. 2B, a second example notification 202*b* is depicted in a driver interface 114 (e.g., a dashboard display). The second example notification 202*b* may correspond to another implementation method. For instance, the second example notification 202*b* may include one or more options 212 that, when selected by the driver, cause one or more associated actions to be performed by the vehicle 102. The action(s) correspond to one or more recommended vehicle drive state adjustments determined to extend the estimated driving range 204. For instance, a first example option 212*a* may be associated with a plurality of actions (e.g., restricting the maximum vehicle speed, changing a driving mode, reducing air conditioning or other climate control use, reducing auxiliary power usage, and/or other actions) that extend the estimated driving range 204 to an adjusted driving range 206. In some examples, other example options 212*b*-212*f* may be associated with each of the plurality of actions or other/or actions from which the driver may select for the vehicle 102 to perform. Presenting a notification 202, such as the second example notification 202*b*, with options 212 for automated actions to be performed by the vehicle 102 may expedite performing the vehicle drive state adjustment actions to improve the driving range of the vehicle 102 more expeditiously.

With reference now to FIG. 2C, a third example notification 202*c* is depicted in a driver interface 114 (e.g., an instrument cluster). The third example notification 202*c* may correspond to another implementation method. For instance, one or more actions corresponding to a determined vehicle drive state adjustment may be automatically performed by the vehicle 102 to extend the estimated driving range 204 to an adjusted driving range 206. The third example notification 202*c* may inform/notify the driver that the actions have been performed. In some examples, a cancel option 214 may be provided for enabling the driver to cancel one or more of the actions. As an example, the driving range optimizer 110 may determine that setting a governor to limit the vehicle speed to 62 miles per hour may extend the estimated driving range 204 at least a threshold amount (e.g., a threshold distance, percent increase of distance or efficiency, or to reach a planned navigation destination without requiring an additional charging stop). Thus, in some implementations, the driving range optimizer 110 may instruct the VCU 104 to set the governor and generate the third example notification 202*c* to notify the driver and provide the driver the option to cancel the vehicle drive state adjustment.

Figure 3:
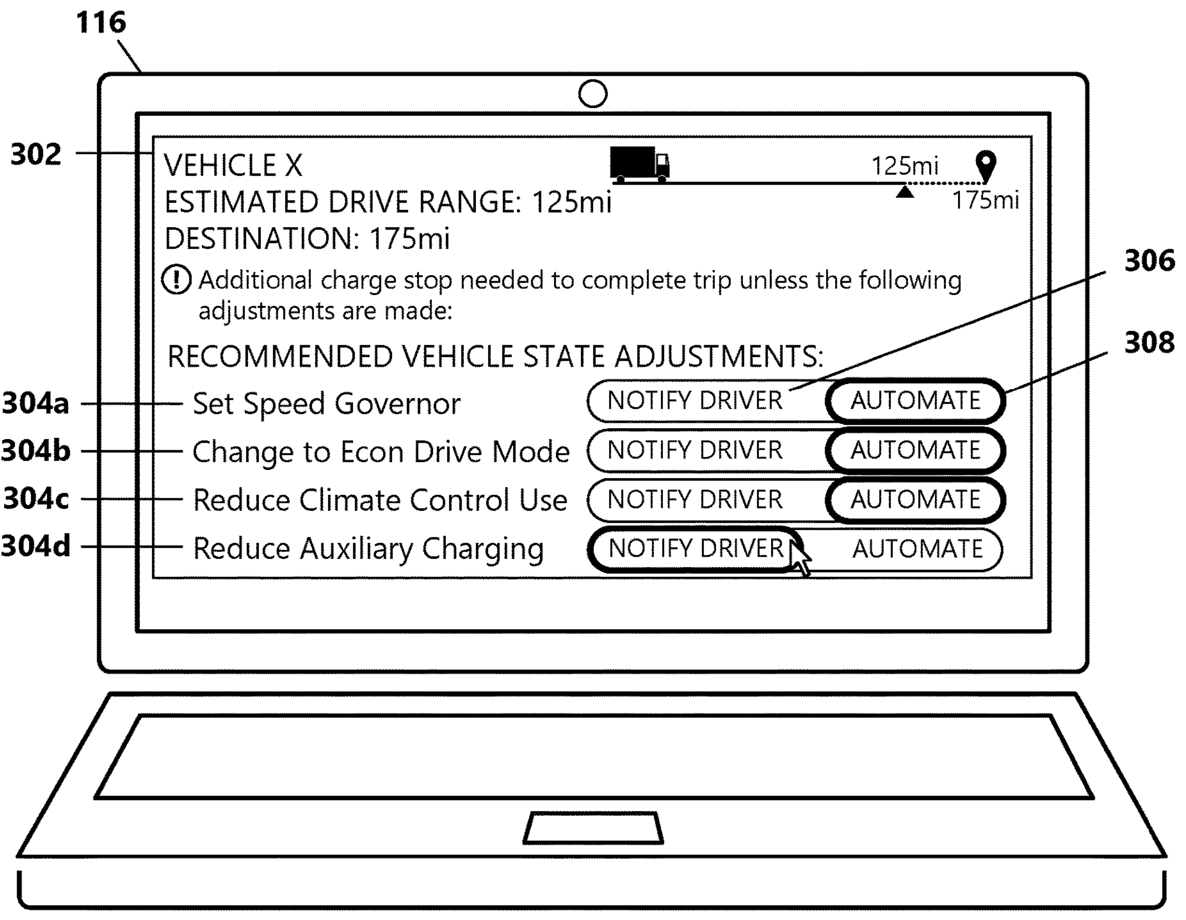
FIG. 3 is a depiction of an example fleet management application interface that may be used for implementing a vehicle drive state adjustment according to an example.

FIG. 3 depicts an example fleet management application interface that may be used for implementing a vehicle drive state adjustment. In some examples, implementing the vehicle drive state adjustment includes generating and presenting a notification 302 to a back-office user of a back-office computing device 116 in communication with a vehicle 102. In some examples, the notification 302 presented to the back-office user may be determined based on an implementation method for applying the vehicle drive state adjustment. In other examples, an implementation method may be predetermined (e.g., prior to when a determination is made of the vehicle drive state adjustment) based on an observed vehicle parameter or combination of vehicle parameters or based on a determined action. For instance, a back-office user of a back-office computing device 116 (e.g., a fleet manager) may pre-select an implementation method when one or a combination of particular parameters are observed. As an example, a predetermination may be made to automatically implement a set speed governor when parameter X, Y, and/or Z is true. As another example, a predetermination may be made to notify the driver and recommend the vehicle drive state adjustment (e.g., rather than automatically implementing a set speed governor) when any of parameter X, Y, or Z is false. In further examples, a particular action (e.g., reducing auxiliary charging) may be predetermined to be manually-implemented only, rather than automatically performed. Other example implementation method predeterminations are possible and within the scope of the present disclosure.

In some examples, the notification 302 notifies/instructs the back-office user to perform an action 304*a*-304*d* corresponding to the vehicle drive state adjustment via the fleet management application 120 to extend the estimated driving range 204 of the vehicle 102. For instance, the back-office user may make one or more selections to perform one or more of the actions 304. In other examples, and as depicted in FIG. 3, the notification 302 includes a first option 306 to notify the driver of vehicle 102 about a recommended action 304 to perform to extend the estimated driving range 204. For instance, selection of the first option 306 may cause a second notification, such as the first 202*a* or second example notifications 202*b* in FIGS. 2A and 2B, to be generated and presented to the driver via the driver interface 114.

In further examples, the notification 302 may include a second option 308 to automatically perform a recommended action 304 to extend the vehicle's estimated driving range 204. For instance, when the second option 308 is selected, the fleet management application 120 may transmit instructions to the vehicle 102 that are received by the VCU 104 and executed to implement the recommended vehicle state adjustments automatically. In yet further examples, and based on a determined implementation method, the vehicle 102 may be automatically instructed by the fleet management application 120 to execute one or more actions corresponding to a determined vehicle drive state adjustment. A notification 302 may inform/notify the back-office user that the actions have been communicated to the vehicle 102 to be performed. In some examples, a cancel option may be provided for enabling the back-office user to cancel one or more of the actions. Presenting a notification 302 may allow the fleet entity to make informed decisions to improve the driving range of the vehicle 102 and other vehicles in the fleet 118 to optimize fleet performance. Additional and/or alternative notifications 202 and 302 are contemplated and may be presented to the driver and/or back-office user via the driver interface 114, the fleet management application interface, and/or a driver communication device 122.

Figure 4:
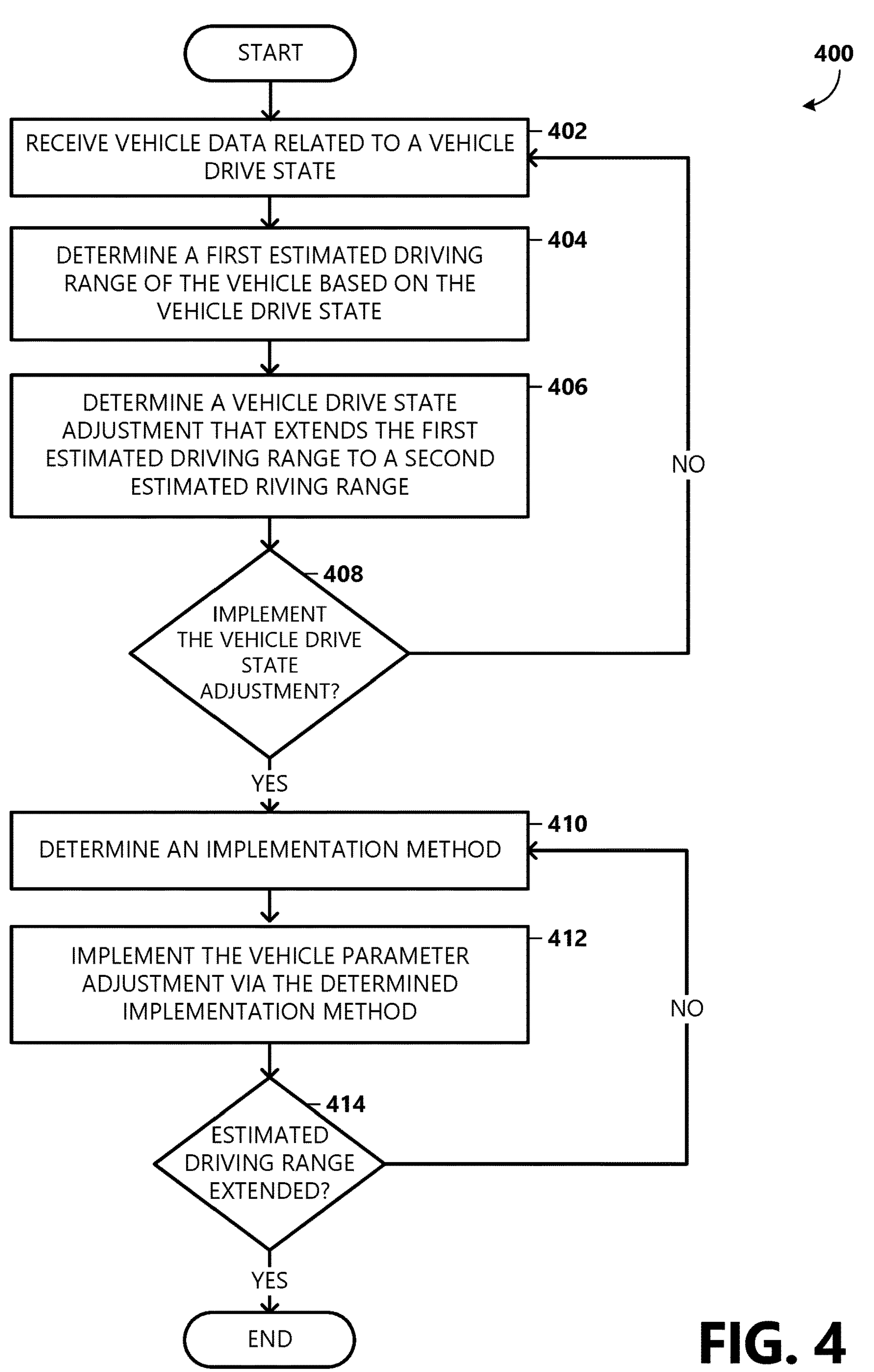
FIG. 4 is a flow chart of an example method for providing driving range optimization according to an example.

With reference now to FIG. 4, a flow diagram is provided illustrating operations corresponding to processing steps of a method 400 that can be used to provide electric vehicle drive range optimization according to an example. At operation 402, vehicle data collected from various sources may be analyzed to derive vehicle parameters related to estimating a driving range of the vehicle 102. For instance, various vehicle parameters, such as battery SOC, an energy consumption rate at which the vehicle 102 is consuming energy, an efficiency factor corresponding to how efficiently the vehicle 102 converts stored energy into driving distance, historical driving patterns corresponding to the driver's historical behavior, occupancy, climate control usage, auxiliary accessory usage, etc., may be derived from collected sensor data.

At operation 404, the derived vehicle parameters may be used in association with battery capacity and other relevant driving factors, such as route, navigation time, terrain data, environmental factors, etc., to determine a vehicle drive state and calculate a first estimated driving range 204 for the vehicle 102. In some examples, the first estimated driving range 204 may provide an indication as to whether the vehicle 102 is able to navigate to a planned destination without additional charging and/or arrive at the planned destination by a target time.

At operation 406, a vehicle drive state adjustment is determined that increases the first estimated driving range 204 to a second estimated driving range (e.g., an adjusted driving range 206). In examples, the vehicle drive state adjustment may include one or more actions that lower the energy consumption rate and/or increase one or more efficiency factors to extend the estimated driving range 204. Some example actions include adjusting vehicle speed (e.g., lowering the vehicle speed or activating a speed governor), adjusting the throttle map, reducing the auxiliary electrical load (e.g., climate control usage, internal lighting, non-essential external lighting, radio usage, or auxiliary accessory charging), changing the vehicle's route, and/or other adjustments.

At decision operation 408, a determination may be made as to whether to implement the determined vehicle drive state adjustment. In some examples, the determination is based on whether the adjusted driving range 206 that is estimated to be achieved if the vehicle drive state adjustment is implemented satisfies a threshold. The threshold may be an improvement amount over the estimated driving range 204 (e.g., a threshold distance, percent increase of distance or current efficiency, or ability to reach a planned navigation destination without requiring an additional charging stop). In some examples, the driving range optimizer 110 communicates with the cloud analytics service 128 to perform additional processing. In some implementations, the additional processing includes processing of vehicle data received from other fleet vehicles and/or other information sources 140.

When a determination is made to implement the vehicle state adjustment, the method 400 may proceed to operation 410, where an implementation method is determined. The implementation method is based on one or more driving range optimization settings and/or factors. For instance, driving range optimization settings may be received by the driving range optimizer 110 and used to determine the implementation method. In some examples, the implementation method is determined based on the improvement amount over the estimated driving range 204. For instance, if the improvement amount is over a certain percentage, distance, and/or current efficiency, a particular implementation method may be determined. In some cases, some implementation methods correspond to notifying/involving the fleet back-office, while other implementation method correspond to an escalated degree of automation of vehicle drive state adjustments. In other examples, the implementation method is based on the driver (e.g., a driver profile or level of experience of the driver). For instance, a first implementation method may be determined for a first driver with a first level of experience and another implementation method may be determined for a second driver with a second level of experience, where the first level of experience may be greater than the second level. The vehicle drive state adjustment may be recommended to the first driver to act on, while the vehicle drive state adjustment action(s) may be automatically performed by the vehicle 102 of the second driver. In other examples, the implementation method is based on whether the vehicle 102 is autonomous or in an autonomous (or semi-autonomous) driving mode. Additionally, one or more actions of the vehicle drive state adjustment may be selected or deselected for implementation for the vehicle 102 based on driving range optimization settings. In other examples, the implementation method may be based on other factors, such as a state of other vehicles in the fleet 118.

At operation 412, the vehicle drive state adjustment may be implemented based on the determined implementation method. In some examples, a notification 202 is generated and presented to the driver via a driver interface 114 or driver communication device 122. The notification 202 may include information about the one or more actions determined to increase the vehicle's driving range. In other examples, a notification 302 is generated and presented to a back-office user of the fleet management application 120 operating on a back-office computing device 116. The notification 202 or 302 may notify the driver or back-office user about the determined vehicle drive state adjustment. In further examples, the notification 202,302 may include one or more selectable options 212, 306, 308 that cause the one or more actions corresponding to the vehicle drive state adjustment to be performed automatically upon selection. In yet further examples, the one or more actions corresponding to the determined vehicle drive state adjustment may be automatically performed by the vehicle 102, as determined by the driving range optimizer 110 or the fleet management application 120.

At decision operation 414, a determination may be made as to whether efficiency improvements are occurring due to performing the vehicle drive state adjustment. For instance, sensor data may be collected and analyzed to derive vehicle parameters that are used to determine whether the vehicle 102 is consuming energy at an improved rate that extends the estimated driving range 204 towards the adjusted driving range 206. In some examples, when a threshold efficiency improvement is not satisfied, the method 400 may return to operation 410, where another implementation method may be determined and implemented to extend the driving range.

Figure 5:
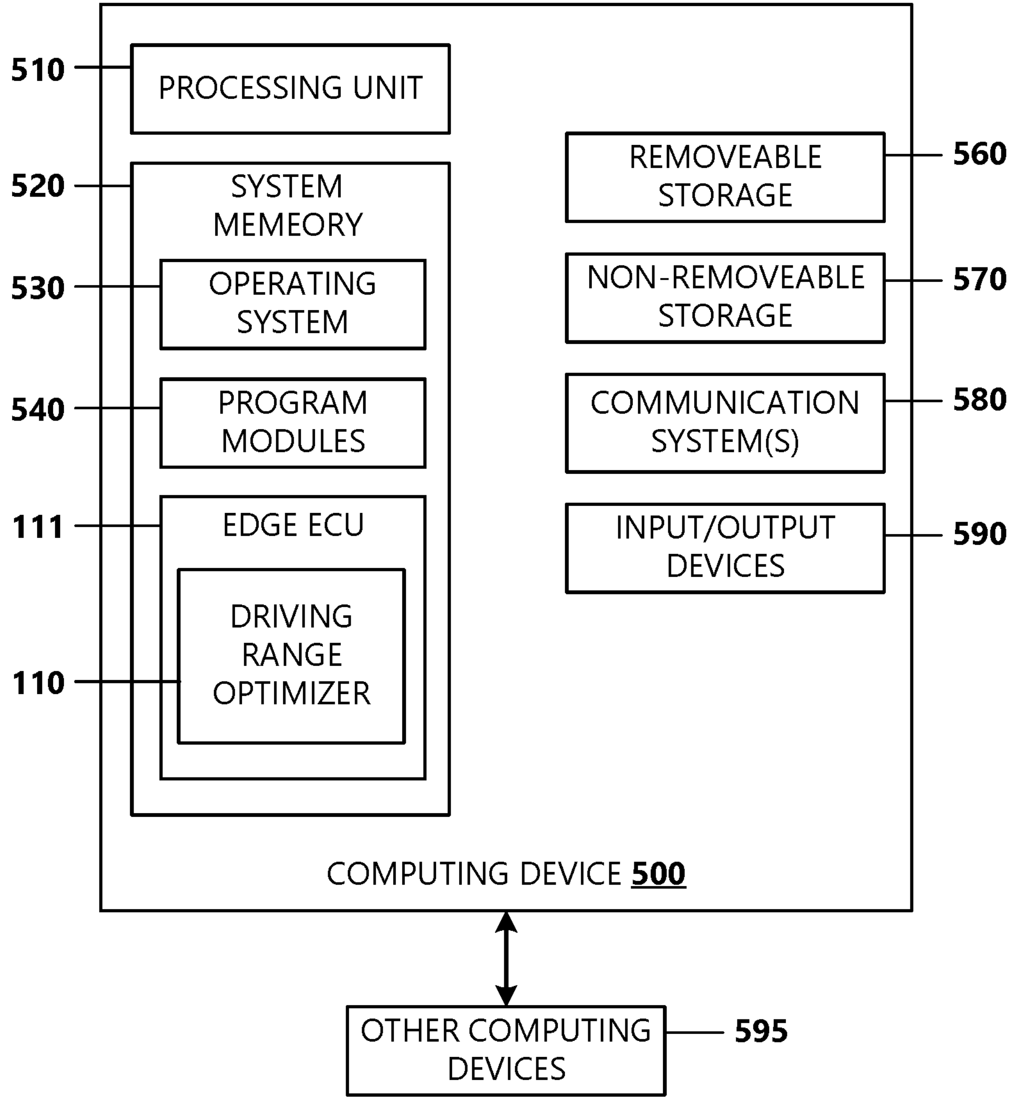
FIG. 5 is a block diagram illustrating example physical components of a computing device or system with which examples may be practiced.

FIG. 5 is a system diagram of a computing device 500 according to an example. As shown in FIG. 5, the physical components (e.g., hardware) of the computing device 500 are illustrated and these physical components may be used to practice the various aspects of the present disclosure.

The computing device 500 may include at least one processing unit 510 and a system memory 520. The system memory 520 may include, but is not limited to, volatile storage (e.g., random access memory), non-volatile storage (e.g., read-only memory), flash memory, or any combination of such memories. The system memory 520 may also include an operating system 530 that controls the operation of the computing device 500 and one or more program modules 540. The program modules 540 may be responsible for performing one more of the operations of the methods described above for providing robust network connectivity. A number of different program modules and data files may be stored in the system memory 520. While executing on the processing unit 510, the program modules 540 may perform the various processes described above. One example program module 540 includes sufficient computer-executable instructions for the drive range optimizer 110.

The computing device 500 may also have additional features or functionality. For example, the computing device 500 may include additional data storage devices (e.g., removable and/or non-removable storage devices) such as, for example, magnetic disks, optical disks, or tape. These additional storage devices are labeled as a removable storage 560 and a non-removable storage 570.

Examples of the disclosure may also be practiced in an electrical circuit comprising discrete electronic elements, packaged or integrated electronic chips containing logic gates, a circuit utilizing a microprocessor, or on a single chip containing electronic elements or microprocessors. For example, examples of the disclosure may be practiced via a system-on-a-chip (SOC) where each or many of the components illustrated in FIG. 5 may be integrated onto a single integrated circuit. Such a SOC device may include one or more processing units, graphics units, communications units, system virtualization units and various application functionality all of which are integrated (or "burned") onto the chip substrate as a single integrated circuit.

When operating via a SOC, the functionality, described herein, may be operated via application-specific logic integrated with other components of the computing device 500 on the single integrated circuit (chip). The disclosure may also be practiced using other technologies capable of performing logical operations such as, for example, AND, OR, and NOT, including but not limited to mechanical, optical, fluidic, and quantum technologies.

The computing device 500 may include one or more communication systems 580 that enable the computing device 500 to communicate with other computing devices 595 such as, for example, routing engines, gateways, signings systems and the like. Examples of communication systems 580 include, but are not limited to, wireless communications, wired communications, cellular communications, radio frequency (RF) transmitter, receiver, and/or transceiver circuitry, a Controller Area Network (CAN) bus, a universal serial bus (USB), parallel, serial ports, etc.

The computing device 500 may also have one or more input devices and/or one or more output devices shown as input/output devices 590. These input/output devices 590 may include a keyboard, a sound or voice input device, haptic devices, a touch, force and/or swipe input device, a display, speakers, etc. The aforementioned devices are examples and others may be used.

The term computer-readable media as used herein may include computer storage media. Computer storage media may include volatile and nonvolatile, removable and non-removable media implemented in any method or technology for storage of information, such as computer readable instructions, data structures, or program modules.

The system memory 520, the removable storage 560, and the non-removable storage 570 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information, and which can be accessed by the computing device 500. Any such computer storage media may be part of the computing device 500. Computer storage media does not include a carrier wave or other propagated or modulated data signal.

Programming modules may include routines, programs, components, data structures, and other types of structures that may perform particular tasks or that may implement particular abstract data types. Moreover, aspects may be practiced with other computer system configurations, including hand-held devices, multiprocessor systems, microprocessor-based or programmable user electronics, minicomputers, mainframe computers, and the like. Aspects may also be practiced in distributed computing environments where tasks are performed by remote processing devices that are linked through a communications network. In a distributed computing environment, programming modules may be located in both local and remote memory storage devices.

Aspects may be implemented as a computer process (method), a computing system, or as an article of manufacture, such as a computer program product or computer-readable storage medium. The computer program product may be a computer storage medium readable by a computer system and encoding a computer program of instructions for executing a computer process. Accordingly, hardware or software (including firmware, resident software, micro-code, etc.) may provide aspects discussed herein. Aspects may take the form of a computer program product on a computer-usable or computer-readable storage medium having computer-usable or computer-readable program code embodied in the medium for use by, or in connection with, an instruction execution system.

The description and illustration of one or more aspects provided in this application are intended to provide a thorough and complete disclosure of the full scope of the subject matter to those skilled in the art and are not intended to limit or restrict the scope of the invention as claimed in any way. The aspects, examples, and details provided in this application are considered sufficient to convey possession and enable those skilled in the art to practice the best mode of the claimed invention. Descriptions of structures, resources, operations, and acts considered well-known to those skilled in the art may be brief or omitted to avoid obscuring lesser known or unique aspects of the subject matter of this application. The claimed invention should not be construed as being limited to any embodiment, aspects, example, or detail provided in this application unless expressly stated herein. Regardless of whether shown or described collectively or separately, the various features (both structural and methodological) are intended to be selectively included or omitted to produce an embodiment with a particular set of features. Further, any or all of the functions and acts shown or described may be performed in any order or concurrently. Having been provided with the description and illustration of the present application, one skilled in the art may envision variations, modifications, and alternate embodiments falling within the spirit of the broader aspects of the general inventive concept provided in this application that do not depart from the broader scope of the present disclosure.

We claim:

1. A method, comprising:

receiving driving range optimization settings for an electric vehicle;

collecting vehicle data corresponding to a driving state of the electric vehicle;

determining an estimated driving range based on the vehicle data;

determining a vehicle driving state adjustment that extends the estimated driving range to an adjusted driving range;

determining that the adjusted driving range satisfies a threshold;

based on the determination that the adjusted driving range satisfies the threshold, selecting, based on the driving range optimization settings, a first implementation method for the vehicle driving state adjustment or a second implementation method for the vehicle driving state adjustment, wherein the first implementation method automatically implements the vehicle driving state adjustment and the second implementation method generates a notification having an option for a user to implement the vehicle driving state adjustment, wherein selecting the implementation method based on the driving range optimization settings comprises selecting the implementation method based on a driver profile of a driver of the electric vehicle; and implementing the vehicle driving state adjustment according to the selected implementation method.

2. The method of claim 1, wherein the vehicle driving state adjustment includes at least one of:

reducing vehicle speed;

limiting the vehicle speed;

changing a throttle map;

reducing an auxiliary electrical load; or changing a route.

3. The method of claim 2, wherein reducing the auxiliary electrical load comprises reducing use of at least one of:

an air conditioner;

internal lighting;

non-essential external lighting;

an entertainment system; or auxiliary accessory charging.

4. The method of claim 1, wherein determining the implementation method based on the driving range optimization settings comprises determining the implementation method based on at least one of:

an improvement of the adjusted driving range over the estimated driving range;

a type of the electric vehicle;

an automation level of the electric vehicle; or an environmental factor.

5. The method of claim 4, further comprising:

receiving an indication of a driving state of at least one other electric vehicle in a fleet including the electric vehicle; and determining the implementation method based on the driving state of the at least one other electric vehicle in the fleet.

6. The method of claim 1, wherein the implementation method comprises providing the notification to a driver of the electric vehicle.

7. The method of claim 6, wherein providing the notification comprises providing a persistent notification requiring a driver action to be dismissed.

8. The method of claim 1, wherein the implementation method comprises providing the notification to a fleet management application.

9. The method of claim 8, further comprising:

receiving, from the fleet management application, an indication of a selection of the option to perform the vehicle driving state adjustment; and performing the vehicle driving state adjustment.

10. The method of claim 1, wherein the vehicle data comprises:

sensor data from at least one of:

at least one sensor on the electric vehicle; or at least one sensor on at least one other electric vehicle in a fleet including the electric vehicle; and a vehicle parameter derived from the sensor data, the vehicle parameter comprises at least one of:

battery state of charge;

an energy consumption rate;

an energy efficiency factor;

driver historical behavior;

climate control usage; or auxiliary accessory usage.

11. The method of claim 10, wherein determining the estimated driving range comprises determining the estimated driving range based on:

the vehicle parameter;

a battery capacity; and at least one of:

a route;

a navigation time;

terrain data; or an environmental factor.

12. An electric vehicle, comprising:

a battery;

sensors; and an edge electronic control unit comprising:

at least one processing unit; and a memory including instructions, which when executed by the at least one processing unit, cause the at least one processing unit to:

collect vehicle data from the sensors corresponding to a driving state of the electric vehicle;

determine an estimated driving range based on a capacity of the battery and the vehicle data;

determine a vehicle driving state adjustment that extends the estimated driving range to an adjusted driving range;

receive driving range optimization settings for the electric vehicle;

determine that the adjusted driving range satisfies a threshold;

based on the determination that the adjusted driving range satisfies the threshold, select, based on the driving range optimization settings, a first implementation method for the vehicle driving state adjustment or a second implementation method for the vehicle driving state adjustment, wherein the first implementation method automatically implements the vehicle driving state adjustment and the second implementation method generates a notification having an option for a user to implement the vehicle driving state adjustment, wherein selecting the implementation method based on the driving range optimization settings comprises selecting the implementation method based on an improvement of the adjusted driving range over the estimated driving range; and implement the vehicle driving state adjustment according to the selected implementation method.

13. The electric vehicle of claim 12, wherein the vehicle driving state adjustment includes at least one of:

reducing vehicle speed;

limiting the vehicle speed;

changing a throttle map;

reducing an auxiliary electrical load; or changing a route.

14. The electric vehicle of claim 13, wherein reducing the auxiliary electrical load comprises reducing use of at least one of:

climate control;

internal lighting;

non-essential external lighting;

an entertainment system; or auxiliary accessory charging.

15. The electric vehicle of claim 12, wherein the driving range optimization settings define at least one of:

a type of the electric vehicle;

a driver profile of a driver of the electric vehicle;

an automation level of the electric vehicle;

a preferred mode of interaction;

an action preference; or a notification type preference.

16. The electric vehicle of claim 12, wherein:

the first implementation method comprises at least one of:

providing the notification to a driver of the electric vehicle to perform the vehicle driving state adjustment; or providing the notification to a fleet management application to perform the vehicle driving state adjustment; and the second implementation method comprises instructing a vehicle control unit of the electric vehicle to automatically perform the vehicle driving state adjustment.

17. A system, comprising:

at least one processing unit; and a memory including instructions, which when executed by the at least one processing unit, cause the system to:

collect vehicle data corresponding to a first driving state of a first electric vehicle and a second driving state of a second electric vehicle;

determine a first estimated driving range for the first electric vehicle and a second estimated driving range for the second electric vehicle based on the vehicle data;

determine a first vehicle driving state adjustment and a second vehicle driving state adjustment, where the first vehicle driving state adjustment extends the first estimated driving range to a first adjusted driving range and the second vehicle driving state adjustment extends the second estimated driving range to a second adjusted driving range;

determine that the first adjusted driving range meets a first threshold and the second adjusted driving range meets a second threshold;

receive fleet settings for the first electric vehicle and the second electric vehicle;

determine, based on the fleet settings, a first implementation method for the first vehicle driving state adjustment and a second implementation method for the second vehicle driving state adjustment;

based on the determination that the first adjusted driving range meets the first threshold, cause the first vehicle driving state adjustment to be implemented according to the first implementation method; and based on the determination that the second adjusted driving range meets the second threshold, cause the second vehicle driving state adjustment to be implemented according to the second implementation method, which is different from the first implementation method.

18. The system of claim 17, wherein:

the first implementation method comprises providing a notification to a driver of the electric vehicle to perform the first vehicle driving state adjustment; and the second implementation method comprises instructing the second vehicle to automatically perform the second vehicle driving state adjustment.

19. The system of claim 17, wherein:

the first vehicle driving state adjustment comprises at least one of:

reducing a speed of the first electric vehicle;

setting a limit on the speed of the first electric vehicle;

changing a throttle map of the first electric vehicle;

reducing an auxiliary electrical load of the first electric vehicle; or changing a route of the first electric vehicle; and the second vehicle driving state adjustment comprises at least one of:

reducing a speed of the second electric vehicle;

setting a limit on the speed of the second electric vehicle;

changing a throttle map of the second electric vehicle;

reducing an auxiliary electrical load of the second electric vehicle; or changing a route of the second electric vehicle.

* * * * *